United States Patent [19]

Stix et al.

[11] Patent Number: 4,518,747

[45] Date of Patent: May 21, 1985

[54] POLYCARBONATES HAVING TERMINAL GROUPS WHICH CONTAIN CONJUGATED DOUBLE BONDS

[75] Inventors: Wolfgang Stix; Ludwig Bottenbruch, both of Krefeld, Fed. Rep. of Germany; Dieter Neuray, New Martinsville, W. Va.

[73] Assignee: Bayer Aktiengesellschaft, Leverkusen, Fed. Rep. of Germany

[21] Appl. No.: 525,381

[22] Filed: Aug. 22, 1983

[30] Foreign Application Priority Data

Aug. 31, 1982 [DE] Fed. Rep. of Germany ....... 3232391

[51] Int. Cl.$^3$ .............................................. C08G 63/62
[52] U.S. Cl. ................... 525/462; 525/439; 528/198; 528/199
[58] Field of Search ................ 528/198, 199; 525/462, 525/439, 44.5

[56] References Cited

U.S. PATENT DOCUMENTS

| | | | |
|---|---|---|---|
| 4,221,645 | 9/1980 | Adelmann et al. | 204/159.14 |
| 4,230,548 | 10/1980 | Adelmann et al. | 204/159.14 |
| 4,310,642 | 1/1982 | Margotte et al. | 525/468 |
| 4,367,186 | 1/1983 | Adelmann et al. | 264/22 |

*Primary Examiner*—Harold D. Anderson
*Attorney, Agent, or Firm*—Gene Harsh; Lawrence S. Pope; Aron Preis

[57] ABSTRACT

The present invention is directed to molding compositions comprising aromatic, thermoplastic polycarbonate resins at least some molecular chains thereof are characterized in that their terminal groups contain conjugated double bonds. The invention is further directed to a process for the preparation of said compositions.

10 Claims, No Drawings

POLYCARBONATES HAVING TERMINAL GROUPS WHICH CONTAIN CONJUGATED DOUBLE BONDS

FIELD OF THE INVENTION

The invention is directed to thermoplastic molding compositions and more specifically to compositions comprising polycarbonates which are characterized in that their end groups contain conjugated double bonds.

SUMMARY OF THE INVENTION

The present invention is directed to molding compositions comprising aromatic, thermoplastic polycarbonate resins at least some molecular chains thereof are characterized in that their terminal groups contain conjugated double bonds. The invention is further directed to a process for the preparation of such compositions.

BACKGROUND OF THE INVENTION

Thermoplastic aromatic polycarbonates having unsaturated terminal groups are known (see German Offenlegungsschriften Nos. 2,746,139 (LeA 18,392), 2,829,256 (LeA 18,847), 2,843,154 (LeA 19,147) and 2,842,004 (LeA 19,148)). The double bonds of these polycarbonates can be utilized for certain reactions (grafting, UV photocrosslinking).

However, there is no controlled molecular weight build-up on heating these polycarbonates, and in fact these products are still stable at temperatures of 280° C. to 300° C.

DETAILED DESCRIPTION OF THE INVENTION

The present invention relates to a process for preparing aromatic polycarbonates having terminal groups which contain conjugated double bonds, which have average molecular weights, $\overline{M}w$ (weight average determined by light-scattering), between 5,000 and 100,000, optionally in a mixture with known aromatic polycarbonates having $\overline{M}ws$ between 5,000 and 100,000 from diphenols, phosgene 1 to 20 mol %, relative to mols of diphenols, chain-terminators, and optional branching agents, by the known phase boundary process or by the process in homogeneous solution, which inventive process is characterized in that chain-terminators of the formula (I)

$$X-A-(CH_2)_n-CH=CH-CH=CH-R \quad (I)$$

are used optionally in a combination with at most equal molar amounts of other, known chain-terminators.

In formula (I), R is an aromatic radical preferably having 6 to 20 carbon atoms, in particular phenyl, or a $C_1-C_8$-alkyl which can be linear or branched most particularly methyl. The variable "n" is an integer between 0 and 7.

In the chain-terminators of the formula (I), X—A— is either X—, that is to say —A— is a single bond, or X—A— is a

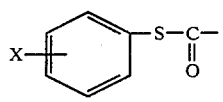

radical or a

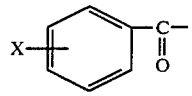

radical, and X— is a functional group which, in the preparation of polycarbonate by the two-phase boundary method or by the homogeneous phase method (pyridine method), acts as reactive part of the chain-terminators of the formula (I).

Examples of X— are

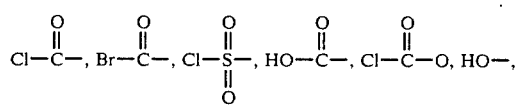

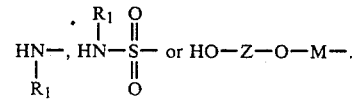

X is preferably

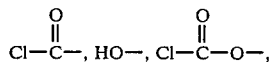

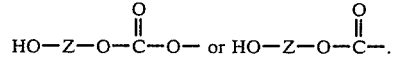

$R_1$ is an aromatic radical preferably having 6 to 20 carbon atoms, in particular phenyl, or an aliphatic radical which has 1 to 6 carbon atoms, in particular methyl; —O—Z—O— is a diphenolate radical preferably having 6 to 30 carbom atoms; —M— is

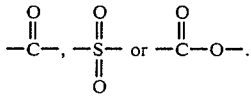

Examples of other, known chain-terminators which may concomitantly be used in the process according to the invention are monophenols, monocarbonyl halides, mono-sulphonyl-chlorides and monochlorocarbonates.

Examples of known chain-terminators which may be concomitantly used are phenol, p-tert.-butylphenol, 2,6-dimethylphenol and p-isooctylphenol.

Examples of chain-terminators of the formula (I) are sorbic acid chloride, sorbic acid, sorbic alcohol ($CH_3$—CH=CH—CH=CH—$CH_2OH$), the chlorocarbonate of sorbic alcohol,

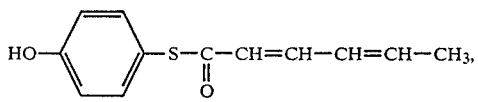

hydroquinone monosorbate and 2,2-bis-(4-hydroxyphenyl)-propane monosorbate.

The diphenol monoesters, such as hydroquinone monosorbate or 2,2-bis-(4-hydroxyphenyl)-propane monosorbate, may be prepared, for example, by dissolving the corresponding diphenol and sorbic acid chloride in a molar ratio of 1:1 to 5:1 in an organic solvent having a boiling point of at least 80° C., heating the solution to at least 80° C., and driving off the resulting HCl in a stream of nitrogen.

The present invention also relates to aromatic polycarbonates having terminal groups which contain conjugated double bonds, which may be obtained by the process according to the invention, and which have the formula (Ia)

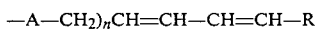   (Ia)

in which R, "n" and —A— have the meansings mentioned for the formula (I), optionally in a mixture with other aromatic polycarbonates which have an $\overline{M}w$ between 5,000 and 100,000 and which are characterized in that their chain-terminations are old in the art.

Aromatic polycarbonates of the invention having weight average molecular weights between 5,000 and 100,000 are preferably those of the formula (II)

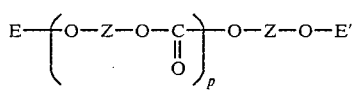   (II)

in which
—O—Z—O— is a diphenolate radical which preferably has 6 to 30 carbon atoms,
E and E' are identical or different and at least one of the radicals E or E' corresponds to a radical of the formula (Ib)

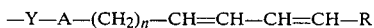

in which
R, "n" and —A— have the meanings mentioned for the formula (I) and
—Y— is the link which results from the reaction of the chain-terminators of the formula (I) optionally also involving phosgene,
and where the other terminal group among E and E' results from the reaction with other, known chain-terminators, optionally also with phosgene,
and where "p" is the degree of polymerization which results from $\overline{M}w$ molecular weights of between 5,000 and 100,000.
Examples of the links —Y— are

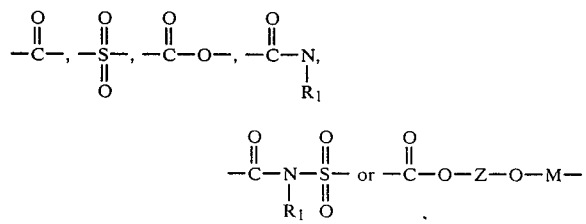

in which $R_1$, Z and M have the meanings mentioned above for the X radicals.
Examples of preferred —Y— links are

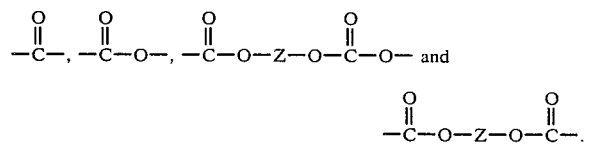

Owing to the terminal groups, the polycarbonates according to the invention are capable of increasing their molecular weight on prolonged heating, that is to say in the course of a thermal treatment.

Diphenols of the formula (III)

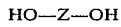   (III)

which preferably have 6 to 30 carbon atoms and are suitable for preparing polycarbonates according to the invention are not only mononuclear but also polynuclear diphenols which can contain heteroatoms and may have substituents which are inert under the conditions of the polycarbonate preparation and the thermal treatment associated therewith.

Examples which may be mentioned are hydroquinone, resorcinol, dihydroxydiphenyl, bis-(hydroxyphenyl)-alkanes, bis-(hydroxyphenyl)-cycloalkanes, bis-(hydroxyphenyl)-sulphides, ethers, ketones, sulphoxides and sulphones, α,α-bis-(hydroxyphenyl)-diisopropylbenzenes and their ring-alkylated and ring-halogenated compounds.

Examples of suitable diphenols are described in U.S. Pat. Nos. 3,028,365, 2,999,835, 3,062,781 and 3,148,172, in German Offenlegungsschriften Nos. 1,570,703 and 2,063,050 and in the monograph by H. Schnell, "Chemistry and Physics of Polycarbonates", Interscience Publishers, New York, 1964, all incorporated herein by reference.

Preferably diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulphone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropyl-benzene, 2,2-bis-(3,5-dichloro-4-hydroxyphenyl)-propane and 2,2-bis-(3,5-dibromo-4-hydroxyphenyl)-propane.

Examples of particularly preferable diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

It is also possible to use any desired mixture of the above-mentioned diphenols.

In preparing block copolycarbonates which have the terminal groups according to the invention it is possible to use, in addition to the monomeric diphenols mentioned, oligomers or polymers which carry two terminal groups which, under the conditions of the polycarbonate synthesis, are capable of a build-up reaction. Examples of such terminal groups are phenolic OH groups, chlorocarbonate groups and carbonyl chloride groups. Ready-made oligomeric or polymeric blocks which due to their manner of preparation already carry the reactive groups mentioned or where such groups can be produced by means of a suitable aftertreatment are, for example, polysiloxanes, polycondensates based on aliphatic diols and saturated aliphatic or aromatic dicarboxylic acids, aromatic polyethers, aromatic polyether sulphones, aliphatic polyethers, saturated aliphatic polyesters based on dimeric fatty acid.

Such co-condensable, bifunctional oligomers or polymers may have $\overline{M}n$ molecular weights (number average determined by vapor pressure osmosis) between 500 and 5,000, and may be used in such amounts that the resulting polycarbonates according to the invention, which contain unsaturated terminal groups, may contain them in amounts between 0 and 80% by weight.

The present invention accordingly also relates to a modification of the preparation process according to the invention, which is characterized in that bifunctional oligomers or polymers which have $\overline{M}n$ molecular weights (number average) between 500 and 5,000 and are cocondensable under the polycarbonate-preparation conditions are used in amounts of 0 to 450% by weight, relative to the quantity by weight of the monomeric diphenols used.

The present invention accordingly also relates to the aromatic segmented polycarbonates which have terminal groups which contain conjugated double bonds, which have the formula (Ia), optionally in a mixture with known aromatic segmented polycarbonates of which chainterminations are brought about by other, known chain-terminators and which can be obtained by this modified process according to the invention.

To improve the flow properties, it is also possible to use in a known manner small amounts, preferably between 0.05 and 2.0 mol % (relative to mols of diphenols used) of compound having a functionality of three or more, in particular those which have three or more phenolic hydroxyl groups. Examples of compounds which have three or more phenolic hydroxyl groups and which may be used are 1,3,5-tri-(4-hydroxyphenyl)-benzene, 1,1,1-tri-(4-hydroxyphenyl)-ethane, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl) orthoterephthalate, tetra-(4-hydroxyphenyl)-methane and 1,4-bis-((4',4''-dihydroxytriphenyl)-methyl)-benzene. Some other trifunctional compounds are 2,4-dihydroxybenzoic acid, trimesic acid, cyanuric chloride and 3,3-bis-(4-hydroxy-3-methylphenyl)-2-oxo-2,3-dihydroindole.

The polycarbonates or polycarbonate mixtures according to the invention may be prepared by the following two known methods (cf. H. Schnell, "Chemistry and Physics of Polycarbonates", Polymer Reviews, Volume IX, page 27 et seq, Interscience Publishers (1964)). 1. By the disperse phase solution method (two-phase interface method):

The diphenols used are dissolved in an aqueous alkaline phase and the chain-terminators required to prepare the polycarbonates according to the invention in amounts of 1.0–20.0 mol %, relative to mols of diphenol are added in the form of a solution in an organic solvent or without a solvent. The system is then reacted with phosgene in the presence of an inert, preferably polycarbonate-dissolving, organic phase. The reaction temperature is between 0° C. and 40° C.

The chain-terminators required may also be added, in the form and amounts as specified above, during the phosgenation.

Examples of suitable organic solvents for the chain-terminators are methylene chloride, chlorobenzene, mixtures of methylene chloride and chlorobenzene, acetone, acetonitrile and toluene.

The reaction can be assisted by catalysts such as tributylamine or triethylamine. To favor incorporation of the chain-terminator it is also possible to use onium salts, such as, for example, tetraalkylammonium halides, as phase transfer catalysts.

If branching agents or co-condensable bifunctional oligomers or polymers are used, they can be added before the reaction with phosgene or during the phosgenation.

It is also possible to use, in addition to or instead of the diphenols, their chlorocarbonates. 2. By the homogeneous phase solution method (also referred to as the pyridine method):

The diphenols are dissolved in organic bases such as pyridine, optionally in the presence of further organic solvents; the chain-terminators required to prepare the polycarbonates according to the invention are then added, as described under 1, at room temperature in amounts of 1.0–20.0 mol %, relative to mols of diphenol.

The system is then reacted with phosgene. The reaction temperature is between 0° C. and 40° C. Examples of suitable organic bases, in addition to pyridine are triethylamine and tributylamine; examples of suitable solvents are methylene chloride, chlorobenzene, toluene and mixtures of methylene chloride and chlorobenzene or toluene.

The polycarbonates prepared in accordance with process variants 1 and 2 are isolated in known manner. In order to avoid any build-up of the molecular weight in the working-up, the temperatures should be kept below 100° C. Suitable working-up methods are, in particular, precipitating, spray-drying or evaporating off solvent in vacuo.

If branching agents or co-condensable bifunctional oligomers are also used, the method described under 1 is used.

It is also possible to use, in addition to the diphenols, up to 50 mol %, relative to the diphenols used, of their bis-chlorocarbonates.

The polycarbonates according to the invention can be converted into higher molecular weight polycarbonates by heating them to temperatures between 150° C. and 400° C., preferably between 200° C. and 350° C. This can turn branched polycarbonates into cross-linked, insoluble products. The time length of the thermal treatment depends on the maximum-temperature and on the molecular weight build-up which is desired. The thermal treatment is advantageously carried out in the course of the processing to give moldings in extruders, compression-molds or injection-molding machines. The thermal treatment can also be carried out by melting the polycarbonates in kneaders or stirred vessels. The degree to which the molecular weight increases can be determined, for example, by comparing the solution viscosity of a sample before the thermal treatment with that after the thermal treatment.

The polycarbonates according to the invention have the advantage that they enable very high molecular weight polycarbonate moldings to be prepared from low-viscosity, highly fluid polycarbonates. Such moldings generally have mechanical and chemical properties which are superior to those of low. molecular weight material.

The polycarbonates according to the invention may also be blended before or in the course of their processing, with known, aromatic thermoplastic polycarbonates having $\overline{M}w$ (weight average molecular weight measured by the light-scattering method) of 10,000 to 200,000 in amounts of 5 to 95% by weight, relative to the amount by weight of the polycarbonates according to the invention, which have terminal groups which contain conjugated double bonds.

Some of such mixtures may also be obtained by selecting the molar ratio of chain-terminators according to the invention, of the formula (I), to known chain-terminators between 0.05 and 0.90.

The present invention accordingly also relates to mixtures which consist of 5 to 95% by weight of polycarbonate of the formula II and to 95 to 5% by weight of known, aromatic, thermoplastic polycarbonates having an $\overline{M}w$ (weight average molecular weight) of 10,000 to 200,000.

The invention is further illustrated, but is not intended to be limited by the following examples in which all parts and percentages are by weight unless otherwise specified.

In the examples which follow, $\eta$ rel. has been measured in $CH_2CL_2$ at 25° C. and a concentration of 0.5 g per 100 ml of $CH_2Cl_2$.

EXAMPLES

Example 1

A solution is prepared from 1.571 kg of 2,2-bis-(4-hydroxyphenyl)-propane (bisphenol A) (6.88 mols), 1.223 kg of a 45% strength aqueous sodium hydroxide solution and 11 liters of distilled water. 27 liters of methylene chloride are added, followed at 20°–25° C. within the course of 2–3 minutes by a solution consisting of 2 liters of methylene chloride, 62.6 kg of sorbic acid chloride (0.48 mol), 396 g of bisphenol A bis-chlorocarbonate (1.12 mols) and 25.8 g of tetrabutylammonium bromide (0.08 mol). 1.155 kg (11.68 mols) of phosgene are then passed in at 20° C.–25° C. with stirring. The pH is maintained at a value of 12 during the phosgeneration by adding a further 2.29 kg of a 45% strength aqueous sodium hydroxide solution. When all the phosgene has been passed in, the pH is raised to a value of 13 by adding a further 0.07 kg of a 45% strength aqueous sodium hydroxide solution, 7 g of triethylamine are added, and the mixture is stirred for a further 30 minutes. The top, aqueous phase is separated off, and the organic phase is acidified and washed until electrolyte-free. The methylene chloride solution is concentrated to dryness, and the resulting product is comminuted and dried at 80° C. for 24 hours in a vacuum drying cabinet. The relative solution viscosity is 1.159.

2 g portions of the polycarbonate obtained are dissolved in 20 ml of methylene chloride, each of the solutions is poured into a 100 ml round-bottomed flask, and the solvent is drawn off at 30°–40° C. with a rotary evaporator in a water jet vacuum.

This leaves polycarbonate films on the insides of the flasks. The flasks are then each immersed for 5 minutes in salt baths at different temperatures to determine the molecular weight build-up at the temperatures used:

$\eta$ rel (starting sample) = 1.159

Heat treatment:
5 minutes at 270° C., $\eta$ rel (after heat treatment) = 1.169
5 minutes at 290° C., $\eta$ rel (after heat treatment) = 1.190
5 minutes at 310° C., $\eta$ rel (after heat treatment) = 1.205.

Example 2

A solution is prepared from 2.192 kg of 2,2-bis-(4-hydroxyphenyl)-propane (bisphenol A) (9.6 mols), 1.787 kg of a 45% strength aqueous sodium hydroxide solution and 14 liters of distilled water. 34 liters of methylene chloride are added, 1.580 kg of phosgene (16 mols) are passed in at 20°–25° C., and 5 minutes after the start of the introduction of phosgene, a solution which consists of 32.2 g (0.1 mol) of tetrabutylammonium bromide, 1,412 g (0.4 mol) of bisphenol A bischlorocarbonate, 52.5 g (0.4 mol) of sorbic acid chloride and 2 liters of methylene chloride is added dropwise at the same time as the phosgene in such a way that all of the solution has been added dropwise 5 to 10 minutes before all the phosgene has been passed in. The pH during the phosgenation is maintained at a value of 12–13 by adding 2,365 kg of a 45% strength aqueous sodium hydroxide solution.

On completion of the phosgenation 275 ml of a 4% strength N-ethylpiperidine solution are added, and the mixture is stirred for 45 minutes. The top, aqueous phase is separated off, and the organic phase is acidified and washed until electrolyte-free. The polycarbonate was precipitated from the organic phase in twice the amount of acetone, and dried at 130° C. for 12 hours in a vacuum drying cabinet. The relative solution viscosity is 1.256.

Transparent films were molded from the material obtained. Table 1, below, lists the molding conditions and the solution viscosity measured on the molded films.

TABLE 1

| Molding pressure [bar] | Molding temperature [°C.] | Molding time [min] | $\eta$ rel on molded film |
|---|---|---|---|
| 80 | 280 | 2 | 1.284 |
| " | " | 5 | 1.305 |
| " | 290 | 2 | 1.273 |
| " | " | 5 | 1.308 |
| " | " | 10 | 1.350 |
| " | " | 15 | 1.377 |
| " | 300 | 2 | 1.289 |
| " | " | 5 | 1.312 |
| " | 310 | 2 | 1.291 |
| " | " | 5 | 1.313 |

Example 3

A solution is prepared from 45.7 g of 2,2-bis-(4-hydroxyphenyl)-propane (bisphenol A) (0.2 mol), 16 g of sodium hydroxide (0.4 mol) and 680 ml of distilled water. 2.36 g of p-hydroxythiophenyl sorbate (0.01 mol) dissolved in 370 ml of methylene chloride are added, followed at 20°–25° C. with stirring by 32 g (0.32 mol) of phosgene. The pH during the phosgenation is maintained at a value of 12 by adding 20 ml of a 45% strength aqueous sodium hydroxide solution. On completion of the phosgenation, the pH is raised to a value of 13–14 by adding a further 20 ml of a 45% strength aqueous sodium hydroxide solution, 4 ml of a 4% strength aqueous triethylamine solution are added, and the mixture is stirred for a further 45 minutes. The top, aqueous phase is separated off, and the organic phase is acidified and washed until electrolyte-free.

The methylene chloride solution is concentrated to dryness, and the product is dried at 80° C. for 12 hours in a vacuum drying cabinet.

The relative solution viscosity is 1.247.

2 g portions of the polycarbonate obtained are dissolved in 20 ml of methylene chloride, each of the solutions is poured into a 100 ml round-bottomed flask, and the solvent is drawn off at 30°-40° C. with a rotary evaporator in a water jet vacuum.

This leaves polycarbonate films on the insides of the flasks. Each of the flasks is then immersed for a certain time in salt baths at different temperatures to determine the molecular weight build-up at the temperatures used.
η rel (starting sample) = 1.247
Heat treatment:
- 5 minutes at 290° C., η rel (after heat treatment) = 1.360
- 5 minutes at 300° C., η rel (after heat treatment) = 1.320
- 5 minutes at 310° C., η rel (after heat treatment) = 1.346
- 10 minutes at 290° C., η rel (after heat treatment) = 1.367
- 15 minutes at 290° C., η rel (after heat treatment) = 1.363.

Example 4

Preparation of a chain-terminator 22.8 g of 2,2-bis-(4-hydroxyphenyl)-propane (bisphenol A) (0.1 mol) and 13.0 g of sorbic acid chloride (0.1 mol) are added to 250 ml of dry toluene and heated at 90° C. in a stream of nitrogen until no more HCl is formed (about 2.5 hours). The pale yellow solution is concentrated to give 31 g of a brownish, viscous oil.
Preparation of the polycarbonate using this chain-terminator:

A solution is prepared from 45.7 g of 2,2-bis-(4-hydroxyphenyl)-propane (bisphenol A) (0.2 mol), 16 g of sodium hydroxide (0.4 mol) and 680 ml of distilled water. 3.87 g of the chain-terminator prepared above and dissolved in 370 ml of methylene chloride are added, followed at 20°-25° C. with stirring by 32 g (0.32 mol) of phosgene. The pH during the phosgenation is maintained at a value of 12 by adding 20 ml of a 45% strength aqueous sodium hydroxide solution. On completion of the phosgenation the pH is raised to a value of 13-14 by adding a further 20 ml of a 45% strength aqueous sodium hydroxide solution, 4 ml of a 4% strength aqueous triethylamine solution are added, and the mixture is stirred for a further 45 minutes. The top, aqueous phase is separated off, and the organic phase is acidified and washed until electrolyte-free.

The methylene chloride solution is concentrated, and the product is dried at 80° C. for 12 hours in a vacuum drying cabinet.

The relative solution viscosity is 1.297.

2 g of the polycarbonate obtained are dissolved in 20 ml of methylene chloride, the solution is poured into a 100 ml round-bottomed flask, and the solvent is drawn off at 30°-40° C. with a rotary evaporator in a water jet vacuum.

The flask is immersed for 10 minutes in a hot salt bath at 300° C. The relative solution viscosity of the novel polycarbonate thus treated is 1.554.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of an aromatic polycarbonate comprising reacting
(i) at least one diphenol
(ii) at least one chain terminator conforming to the formula $$X-A-(CH_2)_n CH=CH-CH=CH-R \quad (I)$$

wherein R is an aromatic radical or a $C_1$-$C_8$ alkyl, n is an integer of between 0 and 7, X is selected from the group consisting of

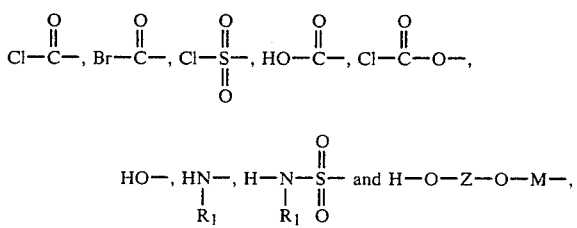

wherein $R_1$ is an aromatic radical or a $C_1$-$C_6$ aliphatic radical and where —O—Z—O— is a diphenolate radical and —M— is

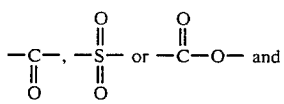

X—A— is either X— or

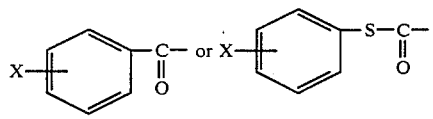

in an amount of about 1 to about 20 mol % relative to the mols of said (i) and
(iii) phosgene which polycarbonate has a weight average molecular weight between about 5,000 and about 100,000.

2. The process of claim 1 further comprising at least one branching agent.

3. The process of claim 1 wherein the chain terminator (ii) is a mixture of one of the formula (I) with a member selected from the group consisting of monophenols, monocarbonylhalides, monosulfonylchlorides and monochlorocarbonates, wherein said mixture the amount of chain terminator of formula (I) is at least 50 mol % referred to the total amount of chain terminators.

4. The process according to claim 1 characterized in that at least one bifunctional polymer having a number average molecular weight between 500 and 5,000 selected from the group consisting of polysiloxanes, polycondensates based on aliphatic diols and saturated aliphatic or aromatic dicarboxylic acids, aromatic polyether sulfones, aliphatic polyethers and saturated aliphatic polyesters based on dimeric fatty acid is co-reacted under the polycarbonate preparation conditions in amounts of 0 to 450% relative to the weight of monomeric diphenol used.

5. The polycarbonate prepared in accordance with the process of claim 1.

6. The polycarbonate prepared in accordance with the process of claim 4.

7. A polycarbonate resin having a weight average molecular weight as determined by light scattering of between 5,000 and 100,000 conforming

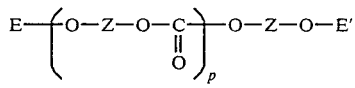

in which —O—Z—O— is a diphenolate radical and wherein E and E' are identical or different and where at least one of the radicals E or E' conforms to —Y—A—CH$_2$)$_n$CH=CH—CH=CH—R in which R is an aromatic radical or a C$_1$-C$_8$ alkyl, n is an integer between 0 and 7 and —Y—A— is either —Y— or

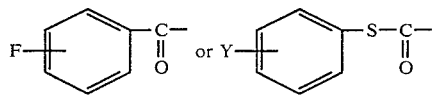

and —Y— is

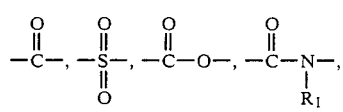

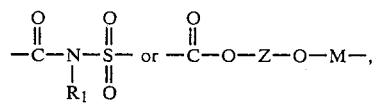

where R$_1$ is an aromatic radical or an aliphatic radical having 1 to 6 carbon atoms and wherein —M— is

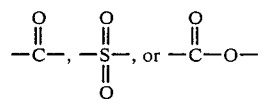

and where the other terminal group E or E' is selected from the group consisting of the monovalent derivatives of monophenols, monocarbonylhalides, monosulfonychlorides, and monochlorocarbonates and wherein p is the degree of polymerization corresponding to said molecular weight.

8. Molding composition comprising a blend consisting of 5 to 95% by weight of the polycarbonate of claim 5 and 95 to 5% by weight of a known aromatic thermophastic polycarbonate having a weight average molecular weight $\overline{M}w$ of about 10,000 to 200,000.

9. A molding composition an aromatic polycarbonate resin having terminal groups which contain conjugated double bonds conforming to the formula —A—CH$_2$)$_n$CH=CH—CH=CH—R wherein A is a single bond or A is

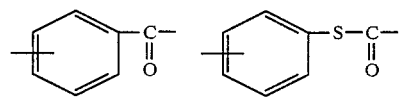

and n is an integer of between 0 to 7 and R is an aromatic radical or a C$_1$-C$_8$-alkyl.

10. A molding composition comprising a blend consisting of 5 to 95% by weight of the polycarbonate of claim 12 and 95 to 5% by weight of a known aromatic thermoplastic polycarbonate having a weight average molecular weight of about 10,000 to 200,000.

* * * * *